(12) United States Patent
Shim et al.

(10) Patent No.: US 9,110,244 B2
(45) Date of Patent: Aug. 18, 2015

(54) POLYESTER-BASED PRIMER COMPOSITION, OPTICAL FILM AND POLARIZING PLATE COMPRISING

(71) Applicant: LG CHEM, LTD., Seoul (KR)

(72) Inventors: Hwa-Sub Shim, Daejeon (KR); Yi-Rang Lim, Daejeon (KR); Jun-Wuk Park, Daejeon (KR); Kyoung-Won Kim, Daejeon (KR); Sung-Hyun Jeon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/349,046

(22) PCT Filed: Dec. 20, 2013

(86) PCT No.: PCT/KR2013/011967
§ 371 (c)(1),
(2) Date: Apr. 1, 2014

(87) PCT Pub. No.: WO2014/178517
PCT Pub. Date: Nov. 6, 2014

(65) Prior Publication Data
US 2014/0333999 A1    Nov. 13, 2014

(51) Int. Cl.
*G02B 5/30* (2006.01)
*C09D 133/14* (2006.01)
*C09D 167/02* (2006.01)
*C09D 175/06* (2006.01)
*C08G 18/66* (2006.01)
(Continued)

(52) U.S. Cl.
CPC ............ *G02B 5/305* (2013.01); *C08G 18/0823* (2013.01); *C08G 18/0828* (2013.01); *C08G 18/44* (2013.01); *C08G 18/4676* (2013.01); *C08G 18/6659* (2013.01); *C08G 18/755* (2013.01); *C09D 133/14* (2013.01); *C09D 167/02* (2013.01); *C09D 175/06* (2013.01); *C09D 175/16* (2013.01); *Y10T 428/31786* (2015.04); *Y10T 428/31797* (2015.04)

(58) Field of Classification Search
CPC .... G02B 5/305; C09D 133/14; C09D 167/02; C09D 175/06
USPC ................ 359/487.01, 487.02; 428/480, 483; 523/435; 524/603
See application file for complete search history.

(56) References Cited

U.S. PATENT DOCUMENTS

| 4,493,872 A | 1/1985 | Funderburk et al. |
| 2002/0061394 A1 | 5/2002 | Fujita |

(Continued)

FOREIGN PATENT DOCUMENTS

| CN | 101981476 A | 2/2011 |
| CN | 102417807 A | 4/2012 |

(Continued)

*Primary Examiner* — Ricky D Shafer
(74) *Attorney, Agent, or Firm* — Dentons US LLP

(57) ABSTRACT

There is provided a polyester-based primer composition including 100 parts by weight of a polyester resin, 1 to 20 parts by weight of water-dispersible particles, and water as a remainder. Since a polyester-based primer composition of the present disclosure is excellent in water resistance and solvent resistance differently from a urethane primer composition, the polyester-based primer composition may obtain sufficient adhesive strength between a protection film and a functional coating layer even without assistance from additives such as a cross-linking agent, and may retain stable adhesive strength for a long period of time.

15 Claims, 1 Drawing Sheet

(51) Int. Cl.
*C08G 18/75* (2006.01)
*C08G 18/08* (2006.01)
*C09D 175/16* (2006.01)
*C08G 18/44* (2006.01)
*C08G 18/46* (2006.01)

(56) References Cited

U.S. PATENT DOCUMENTS

| | | | |
|---|---|---|---|
| 2003/0108687 A1* | 6/2003 | Mizutani et al. | 428/1.31 |
| 2006/0164740 A1* | 7/2006 | Sone et al. | 359/883 |
| 2008/0013177 A1* | 1/2008 | Hatano et al. | 359/586 |
| 2009/0269577 A1 | 10/2009 | Lamers et al. | |
| 2011/0019280 A1 | 1/2011 | Lockridge et al. | |

FOREIGN PATENT DOCUMENTS

| | | |
|---|---|---|
| JP | 2009-227861 A | 10/2009 |
| KR | 10-1990-0018262 B1 | 12/1990 |
| KR | 1995-0006939 B1 | 6/1996 |
| KR | 1999-0083459 A1 | 11/1999 |
| KR | 10-2011-0080414 A | 7/2011 |
| KR | 10-2012-030937 A | 3/2012 |
| TW | 201229162 A1 | 7/2012 |

* cited by examiner

POLYESTER-BASED PRIMER COMPOSITION, OPTICAL FILM AND POLARIZING PLATE COMPRISING

This application is a National Stage application of International Application No. PCT/KR2013/011967, filed Dec. 20, 2013, and claims priority to and the benefit of Korean Application No. 10-2013-0048259, filed on Apr. 30, 2013, the disclosures of which are incorporated herein by reference.

TECHNICAL FIELD

The present disclosure relates to a polyester-based primer composition, and more particularly, to a polyester-based primer composition having high water resistance and solvent resistance, an optical film using the polyester-based primer composition, and a polarizing plate including the optical film.

BACKGROUND ART

In general, polarizing plates have a stacked structure constituted by a polarizer formed of a polyvinyl alcohol (PVA)-based resin and dyed with dichroic dyes or iodine, and a protection film attached to one or both sides of the polarizer using an adhesive. In the related art, triacetyl cellulose (TAC)-based films have mainly been used as protection films for polarizing plates. However, TAC films are easily deformed in high-temperature or high-humidity environments. Therefore, protection films made of various types of material have recently been developed to replace TAC films. For instance, methods of using polyethylene terephthalate (PET), cycloolefin polymer (COP), acrylic films, or combinations thereof have been suggested.

Such films for protecting polarizers may include various functional coating layers, such as reflection preventing layers and hard coating layers formed on sides opposite to polarizers for the purposes of preventing reflections, improving durability, preventing scratches, and improving visibility. Such functional coating layers are generally formed by applying coating compositions including base resins, solvents and additives to protection films, and then curing the coating compositions. However, functional coating layers may not adhere sufficiently to some kinds of protection films. In such cases, functional coating layers may be separated from the protection films or damaged, thereby lowering the performance of polarizing plates.

Although methods of performing surface treatments such as a plasma treatment and a corona treatment on protection films or forming primer layers on protection films have been suggested to solve such problems, such methods remain insufficient to secure reliable adhesion of functional coating layers and protection films (particularly acrylic protection films). In the related art, for instance, urethane primers suggested as primer layers for protection films have low water resistance and solvent resistance. Therefore, if urethane primers are stored under high-moisture conditions for a long period of time, adhesive strength of the urethane primers may be lowered by water penetration, and if coating compositions including organic solvents are applied to primer layers, the primer layers may be swollen by the solvents included in the coating compositions or may be separated from protection films while being dissolved in the coating compositions.

Therefore, there is a need for primer compositions having high water resistance and solvent resistance for polarizing plate protection films.

DISCLOSURE

Technical Problem

Aspects of the present disclosure may provide a primer composition having high water resistance and solvent resistance, while sufficiently improving adhesive strength between a protection film and a functional coating layer and maintaining a high degree of adhesive strength over a long period of time, and an optical film and a polarizing plate including the primer composition.

Technical Solution

According to an aspect of the present disclosure, a polyester-based primer composition may include 100 parts by weight of a polyester resin, 1 to 20 parts by weight of water-dispersible particles, and water as a remainder.

Here, the polyester resin may include repeating units represented by the following Formula 1:

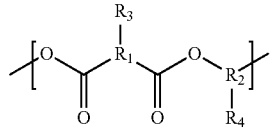

[Formula 1]

where $R_1$ and $R_2$ independently refer to hydrogen, a substituted or unsubstituted $C_{1-20}$ alkyl, a substituted or unsubstituted $C_{1-20}$ aryl, or a substituted or unsubstituted $C_{3-20}$ cycloalkyl; $R_3$ and $R_4$ independently refer to hydrogen, a substituted or unsubstituted $C_{1-20}$ alkyl, a substituted or unsubstituted $C_{1-20}$ aryl, a substituted or unsubstituted $C_{3-20}$ cycloalkyl, a carboxyl group, a hydroxyl group, or a sulfonate group; and at least of $R_3$ and $R_4$ refers to a carboxyl group, a hydroxyl group, or a sulfonate group.

Figure 1:
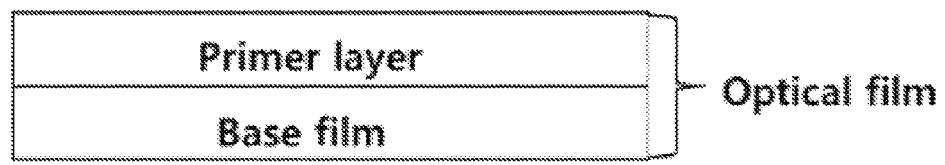
FIG. 1 shows an optical film including a base film and a primer layer.
Figure 2:
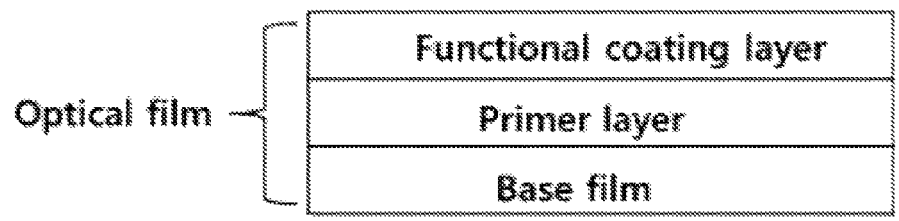
FIG. 2 shows an optical film including a base film, a primer layer, and a functional coating layer.

According to another aspect of the present disclosure, an optical film may include a base film, and a primer layer formed on at least one side of the base film by using the polyester-based primer composition, wherein a functional coating layer such as a hard coating layer or a reflection preventing layer may be formed on the primer layer. See FIGS. 1 and 2.

Further, the base film may be an acrylic film. The acrylic film may include a copolymer including an alkyl(meth)acrylate unit and a 3- to 6-membered heterocyclic unit substituted by at least one carbonyl group. However, the acrylic film is not limited thereto. If circumstances demand, the acrylic film may additionally include an aromatic resin having a carbonate part formed on a main chain thereof.

Figure 3:
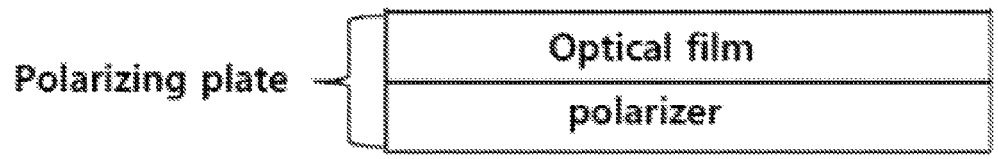
FIG. 3 shows a polarizing plate including a polarizer and an optical film.

According to another aspect of the present disclosure, a polarizing plate may include a polarizer, and the above-described optical film formed on at least one side of the polarizer. See FIG. 3.

Advantageous Effects

Since the polyester-based primer composition of the present disclosure has high water resistance and solvent resistance unlike urethane primer compositions, the polyester-based primer composition may guarantee sufficient adhesive strength between a protection film and a functional coating layer even without assistance from additives such as a cross-linking agent, and may retain stable adhesive strength for a long period of time.

BEST MODE

Exemplary embodiments of the present disclosure will now be described in detail.

As a result of repeated research into the development of technology for improving adhesion between an optical film and a functional coating layer formed on at least one side of the optical film, the present inventors have realized the development of the polyester-based primer composition of the present disclosure including a polyester resin as a base resin.

More specifically, the polyester-based primer composition of the present disclosure includes 100 parts by weight of a polyester resin, 1 to 20 parts by weight of water-dispersible particles, and water as a remainder, wherein the 'remainder' refers to contents remaining in the primer composition except for solid contents.

In the present disclosure, the polyester resin refers to a resin including an ester group formed on a main chain thereof through the reaction of carboxylic acid and alcohol. The polyester resin may be a water-dispersible polyester resin, and may further include a polyester glycol formed through the reaction of a polybasic acid and a polyol.

For example, components of the polybasic acid may include: aromatic dicarboxylic acids such as ortho-phthalic acid, isophthalic acid, terephthalic acid, 1,4-naphthalene dicarboxylic acid, 2,5-naphthalene dicarboxylic acid, 2,6-naphthalene dicarboxylic acid, biphenyl dicarboxylic acid, and tetrahydro phthalic acid; aliphatic dicarboxylic acids such as oxalic acid, succinic acid, malonic acid, glutaric acid, adipic acid, pimelic acid, suberic acid, azelaic acid, sebacic acid, linoleic acid, maleic acid, fumaric acid, mesaconic acid, and itaconic acid; alicyclic dicarboxylic acids such as hexahydrophthalic acid, tetrahydrophthalic acid, 1,3-cyclohexane dicarboxylic acid, and 1,4-cyclohexane dicarboxylic acid; or reactive derivatives thereof such as acid anhydrides, alkyl esters, and acid halides. These components of the polybasic acid may be used independently or in the form of combinations of two or more thereof. Particularly, terephthalic acid, isophthalic acid, and succinic acid may be used. Further, isophthalic acid substituted by a sulfonate may be used as a basic acid particularly in terms of water dispersibility.

Meanwhile, components of the polyol are not particularly limited if the components have two or more hydroxyl groups in molecules thereof, and an arbitrary polyol may be employed as one of the components of a polyol. For example, the polyol may include at least one selected from the group consisting of ethylene glycol, 1,2-propanediol, 1,3-propanediol, 1,3-butanediol, 1,4-butanediol, neopentyl glycol, pentanediol, 1,6-hexanediol, 1,8-octanediol, 1,10-decanediol, 4,4'-dihydroxyphenylpropane, 4,4'-dihydroxymethylmethane, diethylene glycol, triethylene glycol, polyethylene glycol (PEG), dipropylene glycol, polytetramethylene glycol (PTMG), polypropylene glycol (PPG), 1,4-cyclohexanedimethanol, 1,4-cyclohexanediol, bisphenol A, bisphenol F, glycerin, 1,1,1-trimethylolpropane, 1,2,5-hexatriol, pentaerythritol, glucose, sucrose, and sorbitol. Particularly, in terms of water dispersibility, the polyol may include one or more of dimethylol alkanoic acids, dimethylol acetic acids, dimethylol propionic acids, dimethylol butanoic acids, and combinations.

Meanwhile, the above-described polyester glycol may be formed by reacting a polybasic acid and a polyol at a mol ratio of 2.5:1 to 1:2.5, preferably at a mol ratio of 2.3:1 to 1:2.3, and more preferably at a mol ratio of 2:1 to 1:2. If the reaction mol ratio is deviated from the above-described ranges, non-reacted monomers may generate smell or cause coating defects.

If occasion demands, the polyester resin may become a polyester acrylic resin including ester units and acryl based units as well by additionally copolymerizing acrylic monomers. In this case, the ester units may play a role in increasing adhesion of a base film, and the acrylic units may further improve solvent resistance.

For example, the acrylic monomers usable in the present disclosure may be one or more selected from the group consisting of alkyl(meth)acrylates, alkyl acrylates, epoxy(meth)acrylates, hydroxyalkyl acrylates, carbonyl group-including alkyl(meth)acrylic acids, alkyl acrylic acids, and sulfonate-including acrylates. For instance, the sulfonate-including acrylates may be acrylates including sodium 2-methyl-2-propene-1-sulfonate, acrylates including sodium aryl sulfonate, and acrylates including 2-propene-1-sulfonate. Meanwhile, if the polyester resin is copolymerized with epoxy group-containing epoxy acrylate monomers of the listed examples of the acrylic monomers, the high temperature stability of the polyester resin may be increased because epoxy rings of the epoxy group-containing epoxy acrylate monomers are dissociated at high temperatures and are cross-linked by additional polymerization therebetween to improve high temperature durability of main chains of the polyester resin.

Further, if occasion demands, the polyester resin may be copolymerized with other monomers in addition to components of the acrylic monomers. Examples of the other monomers may include: unsaturated nitriles such as (meth)acrylonitrile; unsaturated amides such as (meth)acrylamide; olefins such as ethylene and propylene; β-unsaturated aliphatic monomers such as halogenated vinyl chloride and vinylidene chloride; β-unsaturated aromatic monomers such as styrene and methyl styrene; and combinations of two or more thereof.

Two or more acrylic monomers may be included in the polyester resin of the present disclosure. For example, alkyl(meth)acrylate monomers and epoxy(meth)acrylate monomers such as glycidyl(meth)acrylate may be additionally included in the polyester resin of the present disclosure.

As described above, when the acrylic monomers are additionally included in the polyester resin, the weight ratio of the polyester glycol and the acrylic monomers may be from about 1:9 to about 9:1, more preferably from about 2:8 to about 8:2, and most preferably from about 3:7 to about 7:3. If contents of the polyester resin and acrylic monomers satisfy the above-described numerical value ranges, properties of the polyester resin such as solvent resistance and adhesion to a base film may be improved.

A method of preparing the polyester resin may employ arbitrary methods well-known in relevant technical fields. For instance, the polyester resin of the present disclosure may be prepared by a method of performing esterification of a polybasic acid and a polyol and then conducting polycondensation of the esterified product, or a method of performing esterification of a polybasic acid anhydride and a polyol and then conducting condensation polymerization on the esterified product. More specifically, the above-described methods may include (1) a raw material mixing step of mixing polymerization raw materials for the polymerization of polyester to obtain a raw material mixture, (2) an esterification step of esterifying the raw material mixture, and (3) a polycondensation step of performing polycondensation of the esterified raw material mixture to obtain polyester.

For example, the polyester resin used in the present disclosure, which is prepared through the above-described methods, may include repeating units represented by the following Formula 1:

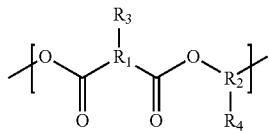

[Formula 1]

where $R_1$ and $R_2$ independently refer to hydrogen, a substituted or unsubstituted $C_{1-20}$ alkyl, a substituted or unsubstituted $C_{1-20}$ aryl, or a substituted or unsubstituted $C_{2-20}$ cycloalkyl; $R_3$ and $R_4$ independently refer to hydrogen, a substituted or unsubstituted $C_{1-20}$ alkyl, a substituted or unsubstituted $C_{1-20}$ aryl, a substituted or unsubstituted $C_{3-20}$ cycloalkyl, a carboxyl group, a hydroxyl group, or a sulfonate group; and at least one of $R_3$ and $R_4$ refers to a carboxyl group, a hydroxyl group, or a sulfonate group. It is particularly preferable that $R_3$ or $R_4$ may be a carboxyl group or a sulfonate group.

For example, the polyester resin used in the present disclosure may include repeating units represented by the following Formula 2:

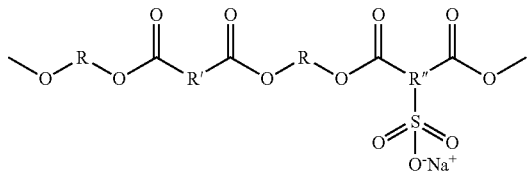

[Formula 2]

where R, R' and R" independently refer to hydrogen, a substituted or unsubstituted $C_{1-20}$ alkyl, a substituted or unsubstituted $C_{1-20}$ aryl, or a substituted or unsubstituted $C_{3-20}$ cycloalkyl.

On the other hand, the polyester resin may further include additional components besides the above-described components within a range in which the components do not damage physical properties of the present disclosure.

If the primer composition of the present disclosure includes 1 to 20 parts by weight of water-dispersible particles with respect to 100 parts by weight of a polyester resin, the workability, winding properties, slip properties, and transparency of the primer composition may be improved.

Arbitrary particles may be used as the above-described water-dispersible particles that are used in the present disclosure. For example, the arbitrary particles may include inorganic particles, organic particles, or combinations thereof. Examples of the inorganic particles may include silica, titania, alumina, zirconia, and antimony-based inorganic oxides. Examples of the organic particles may include silicone-based resins, fluorine-based resins, (meth)acrylic resins, cross-linked polyvinyl alcohols, and melamine-based resins.

Among the above-described water-dispersible particles, silica is particularly preferable, since silica is excellent in blocking suppression capability, does not generate haze due to its excellent transparency, and does not have any coloring so that optical properties of a polarizing plate are less influenced by silica. Further, workability in the formation of a primer layer is also more excellent since colloidal silica is good at dispersibility and dispersion stability with respect to a primer composition.

Meanwhile, the water-dispersible particles may preferably have an average diameter (an average diameter of primary particles) from about 10 nm to about 200 nm and more preferably from about 20 nm to about 70 nm. Stability of the solution may be hindered since coagulation and sedimentation of the water-dispersible particles occur in a primer solution due to high surface energy when the average diameter of the water-dispersible particles is less than 10 nm. Haze of the particles is increased by scattering light having a wavelength of 400 nm or more onto the particles since, when the average diameter of the water-dispersible particles is more than 200 nm, dispersion of the water-dispersible particles does not occur evenly in the primer solution, and sizes of the water-dispersible particles are increased compared to a wavelength range from about 400 nm to about 800 nm of visible light while the particles are agglomerated. Particles having particle diameters within the above-described range are used, and irregularities are applicably formed on the surface of the primer layer so that friction forces particularly on contact surfaces between an acrylic film and a primer layer and/or between the primer layers may be effectively reduced. As a result of that, the particles may have more excellent blocking suppression capability.

Since the primer composition of the present disclosure is a water-based primer composition, the particles may be mixed into a water dispersion. Specifically, when silica is employed as the particles, the particles may be mixed into colloidal silica. Products commercially available on the market in relevant technical fields as colloidal silica may be used as they are, and examples of colloidal silica may include Snowtex by Nissan Chemical Corporation, AEROSIL by Air Products & Chemicals, Epostar and Soliostar RA by Nippon Shokubai Co., Ltd., and LSH by Ranco.

The primer composition of the present disclosure includes water to control viscosity of the primer composition. Preferably, the primer composition of the present disclosure may include a solid content of about 1% by weight to about 30% by weight. There are problems that coating properties of the primer composition decrease so that it becomes difficult to form a primer layer if the primer composition of the present disclosure includes a solid content of about less than 1% by weight, and that high viscosity of the primer composition lowers leveling properties of the primer composition so that external defects are easily formed during coating of the primer composition if the primer composition of the present disclosure includes a solid content of about 30% by weight or more.

Since the above-described primer composition of the present disclosure is excellent in water resistance and solvent resistance, although a coating composition using an organic solvent is coated on a primer layer, the primer layer is not easily delaminated or dissolved and maintains excellent adhesive strength over a long period of time.

Next, an optical film of the present disclosure is described. The optical film of the present disclosure may include: a base film; and a primer layer formed on at least one side of the base film by the above-described primer composition of the present disclosure. Here, detailed description of the primer composition is omitted since the primer composition is the same as the primer composition that is described above.

Meanwhile, the base film may be formed in a single layer or in such a structure that two or more films are laminated. If the base film is formed in such a structure that two or more films are laminated, the laminated films may be formed of materials that are identical to each other or different from each other.

For example, the base film may be an acrylic film. Here, the acrylic film refers to films including, as main components, resins including acrylate based units and/or (meth)acrylate based units, and the acrylic film is a concept including films including, as main components, copolymer resins in which other monomer units besides acrylate based units and/or (meth)acrylate based units are copolymerized as well as homopolymer resins including acrylate based units or (meth) acrylate based units, and films formed by a blend resin in which other resins are blended into the above-described acrylic resin.

The monomer units that are copolymerizable into the acrylic resin may include aromatic vinyl based units, 3- to 6-membered heterocyclic units substituted by carbonyl groups, acrylic acid units, and glycidyl units. Examples of the aromatic vinyl based units may include units derived from styrene, α-methyl styrene, and the like. Examples of 3- to 6-membered heterocyclic units substituted by carbonyl groups may include units derived from lactone rings, glutaric anhydrides, glutarimides, maleimides, maleic anhydrides, and the like.

For instance, the acrylic film may be films including copolymers including alkyl(meth)acrylate based units and 3- to 10-membered heterocyclic units substituted by at least one carbonyl group. Here, 3- to 10-membered heterocyclic units substituted with the carbonyl groups may be lactone rings, glutaric anhydrides, glutarimides, maleic anhydrides, maleimides, and the like.

Other examples of the acrylic film may include films including a blended resin in which an aromatic resin having a carbonate part formed on its main chain is blended into an acrylic resin, wherein examples of the aromatic resin having a carbonate part formed on its main chain may include a polycarbonate resin, a phenoxy resin, and the like.

A method of manufacturing an acrylic resin film is not particularly limited. For instance, the method of manufacturing an acrylic resin film may include sufficiently mixing an acrylic resin, other polymers and additives by an arbitrary mixing method to prepare a thermoplastic resin composition, and then forming the thermoplastic resin composition into an acrylic resin film, or may include preparing a separate solution, mixing an acrylic resin, other polymers and additives with the solution to form a uniformly mixed solution, and then forming the mixed solution into an acrylic resin film.

For instance, after raw materials for the film are pre-blended to obtain a mixture by an arbitrary mixer such as an omni mixer, the mixture is kneaded and extruded to prepare the thermoplastic resin composition. In this case, the mixers used in kneading and extrusion are not particularly limited. Examples of the mixers may be extruders such as a single-screw extruder and a twin-screw extruder or arbitrary mixers such as pressing kneaders.

Examples of the film forming method may include a solution casting method, a melt extrusion method, a calendaring method, and a compression molding method. Particularly, the solution casting method and the melt extrusion method may be used.

Examples of solvents usable in the solution casting method may include: aromatic hydrocarbons such as benzene, toluene, xylene and the like; aliphatic hydrocarbons such as cyclohexane, decaline and the like; esters such as ethyl acetate, butyl acetate and the like; ketones such as acetone, methyl ethyl ketone, methyl isobutyl ketone and the like; alcohols such as methanol, ethanol, isopropanol, butanol, isobutanol, methyl cellosolve, ethyl cellosolve, butyl cellosolve and the like; ethers such as tetrahydrofuran, dioxane and the like; halogenated hydrocarbons such as dichloromethane, chloroform, carbon tetrachloride and the like; dimethyl formamide; and dimethyl sulfoxide. These solvents may be used independently or in the form of combinations of two or more thereof.

Examples of an apparatus for performing the solution casting method may include a drum type casting machine, a band type casting machine, a spin coater and the like. Examples of the melt extrusion method may include a T-die method and an inflation method. The forming method is performed in a temperature range preferably from 150° C. to 350° C. and more preferably from 200° C. to 300° C.

When forming a film by the T-die method, a T-die is mounted on a front end portion of a well-known single- or twin-screw extruder, a film extruded in a film form is wound to obtain a roll-shaped film. A temperature of a winding roll is adjusted so that stretching is applied to the film in an extrusion direction to stretch the film monoaxially. Further, the film may be stretched in a direction that is perpendicular to the extrusion direction to perform simultaneous biaxial stretching, successive biaxial stretching and the like.

The acrylic film may be a non-stretched film or a stretched film. The acrylic film may be a monoaxially stretched film or a biaxially stretched film when the acrylic film is the stretched film, and the acrylic film may be a simultaneous biaxially stretched film or a successive biaxially stretched film when the acrylic film is the biaxially stretched film. When the acrylic film is biaxially stretched, mechanical strength of the film is improved so that performance of the film is improved. The acrylic film may suppress an increase in retardation and maintain optical isotropy even when an acrylic resin is mixed with other thermoplastic resins, the mixture is molded into a film, and the film is stretched.

A stretching temperature may be within a range near a glass transition temperature of a thermoplastic resin composition as film raw material, preferably from (a glass transition temperature −30° C.) to (a glass transition temperature +100° C.), and more preferably from (a glass transition temperature −20° C.) to (a glass transition temperature +80° C.). It will be apprehended that sufficient stretching magnification may not be obtained when the stretching temperature is less than about (a glass transition temperature −30° C.). Conversely, when the stretching temperature exceeds about (glass transition temperature +100° C.), it will be apprehended that flowing of the resin composition occurs so that stable stretching may not be conducted.

A stretching magnification defined as an area ratio is preferably from 1.1 times to 25 times and more preferably from 1.3 times to 10 times. It will be apprehended that a stretching magnification is less than 1.1 times may not lead to an improvement of toughness. It will be apprehended that effects as high as the stretching magnification is increased may not be recognized when the stretching magnification exceeds about 25 times.

A stretching speed is preferably from 10%/min to 20,000%/min and more preferably from 100%/min to 10,000%/min in one direction. When the stretching speed is less than 10%/min, it will be apprehended that manufacturing costs may increase, since to obtaining sufficient stretching magnification takes a relatively long time. When the stretching speed exceeds 20,000%/min, it will be apprehended that fractures may occur in a stretched film.

In order to stabilize optical isotropy and mechanical properties of an acrylic film, the acrylic film may be subjected to a heat treatment (annealing) and other processes. Heat treatment conditions are not particularly limited, and arbitrary conditions that are well-known to the related art may be employed as the heat treatment conditions.

Meanwhile, as described above, the primer composition of the present disclosure may be coated on at least one side of a base film to form a primer layer so that the optical film of the present disclosure may be manufactured. Here, the coating process may be performed by methods that are well-known in relevant technical fields, e.g., methods of coating the primer composition on the base film using a bar coating process, a gravure coating process, a slot die coating process and the like, and drying the primer composition coated on the base film. Although the drying process may be performed through a convection oven and the like, the drying process is not limited thereto. The drying process may be performed preferably at a temperature from 100° C. to 120° C. for about one minute to about five minutes. The drying temperature varies according to steps of coating the primer composition. In case of a stretching-completed film, the drying process may be performed in a temperature range in which the drying temperature does not exceed a glass transition temperature (Tg) of the film. In a case including the stretching process, the drying process is performed at a stretching temperature at the same time as the stretching process is conducted, and the drying process may be performed in a temperature range in which the drying temperature does not exceed a decomposition temperature (Td) of the film.

On the other hand, the primer layer formed by the above-described method may have a thickness preferably from 50 nm to 2000 nm, more preferably from 100 nm to 1500 nm, and furthermore preferably from 300 nm to 1000 nm. There is a problem that adhesive power is not sufficient when the primer layer has a thickness of less than 50 nm. There is a problem that the primer composition is not sufficiently dried or water-dispersible particles are buried in the primer layer so that slip properties are not properly given when the primer layer has a thickness of more than 2000 nm.

Furthermore, if necessary, a surface treatment process for improving adhesive strength may be performed on at least one side of the optical film. The surface treatment process may be one or more selected from the group consisting of an alkali treatment, a corona treatment, and a plasma treatment. The surface treatment process may be performed when an optical film used in the present disclosure is an acrylic film that does not include lactone rings.

Meanwhile, as described above, after a primer layer is formed on at least one side of a base film, functional coating layers such as a hard coating layer, a reflection preventing layer and the like may be laminated on the top of the primer layer.

Here, the functional coating layers may be formed in various compositions according to functions that are given to the functional coating layers. For instance, the functional coating layers may be formed by a functional coating layer-forming composition including a binder resin, particles, a solvent, and so on.

For instance, in the present disclosure, the functional coating layer-forming composition may include, as the binder resin, binder resins which are well-known in relevant technical fields such as an acrylic binder resin, a urethane binder resin, or a mixture thereof.

Types of the acrylic binder resin are not particularly limited, and any acrylic binder resins that are well-known in relevant technical fields may be selected and used without particular limitation. Examples of the acrylic binder resin may include acrylate monomers, acrylate oligomers, or mixtures thereof. Here, the acrylate monomers or acrylate oligomers may include one or more acrylate functional groups that are capable of being participated in a curing reaction.

Types of the acrylate monomers and acrylate oligomers are not particularly limited, and the acrylate monomers and acrylate oligomers usually used in technical fields to which the present disclosure belongs may be selected and used without limitations.

Further, examples of the acrylate oligomers may include urethane acrylate oligomers, epoxy acrylate oligomers, polyester acrylates, polyether acrylates, or mixtures thereof. Examples of the acrylate monomers may include dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylolpropane ethoxy triacrylate, 1,6-hexandiol diacrylate, propoxylated glycerol triacrylate, tripropylene glycol diacrylate, ethylene glycol diacrylate, or combinations thereof. However, the acrylate oligomers and the acrylate monomers are not necessarily limited to the examples.

Meanwhile, examples of the particles may include organic particles, inorganic particles, or mixtures thereof. The content of the particles is not limited, and the particles may be contained in an amount ranging from about 0.1 part by weight to about 10 parts by weight with respect to 100 parts by weight of the binder resin. When the content of the particles satisfies the numerical value range, there are merits that haze values are sufficiently realized, and coating properties are improved.

On the other hand, when mixtures of the organic particles and inorganic particles are used as the particles, the inorganic particles may be contained within an amount ranging from about 20 parts by weight to about 80 parts by weight with respect to 100 parts by weight of the organic particles. When the amount of the inorganic particles satisfies the numerical value range, there are merits that scratch resistance is excellent, and good coating surface is obtained.

Further, examples of the inorganic particles may include one selected from silica, silicon particles, aluminum hydroxide, magnesium hydroxide, alumina, zirconia and titania, or combinations of two or more thereof. The inorganic particles are not necessarily limited to the examples.

Examples of the organic particles may include one or more polymers selected from polystyrene, poly(methyl methacrylate), poly(methyl acrylate), polyacrylate, polyacrylate-co-styrene, polymethylacrylate-co-styrene, polymethylmethacrylate-co-styrene, polycarbonate, polyvinyl chloride, polybutylene terephthalate, polyethylene terephthalate, polyamides, polyimides, polysulfone, polyphenylene oxide, polyacetal, epoxy resin, phenolic resin, silicone resin, melamine resin, benzoguanamine, polydivinylbenzene, polydivinylbenzene-co-styrene, polydivinylbenzene-co-acrylate, poly(diallyl phthalate) and triallyl isocyanurate polymer, or copolymers of two or more thereof.

Meanwhile, although the solvent is not limited to the amount, the solvent may be contained in an amount ranging from about 50 parts by weight to about 500 parts by weight with respect to 100 parts by weight of the binder resin. When the content of the solvent satisfies the numerical value range, the functional coating layer is excellent in coating properties, the coating film has excellent film strength, and the coating film is easily manufactured to form a thick film.

Types of solvents usable in the present disclosure are not particularly limited, and organic solvents may normally be used. Examples of the organic solvents may include one or more selected from the group consisting of $C_1$-$C_6$ lower alcohols, acetates, ketones, cellosolves, dimethylformamide, tetrahydrofuran, propylene glycol monomethyl ether, toluene, and xylene.

Examples of the lower alcohols may include one selected from methanol, ethanol, isopropyl alcohol, butyl alcohol, isobutyl alcohol and diacetone alcohol, examples of the acetates may include one selected from methyl acetate, ethyl acetate, isopropyl acetate, butyl acetate and cellosolve acetate, and examples of the ketones may include one selected from methyl ethyl ketone, methyl isobutyl ketone, acetyl acetone and acetone. However, they are not limited to the examples.

Meanwhile, if it is necessary, the composition for forming a functional coating layer according to the present disclosure may additionally include a UV curing initiator added for the purpose of curing through UV irradiation. Although examples of the UV curing initiator may include one selected from 1-hydroxy cyclohexylphenyl ketone, benzyl dimethyl ketal, hydroxyl dimethyl acetophenone, benzoin, benzoin methyl ether, benzoin ethyl ether, benzoin isopropyl ether and benzoin butyl ether, or combinations of two or more thereof, the UV curing initiator is not limited to the examples.

The UV curing initiator may preferably be added in an amount ranging from 0.1 parts by weight to 10 parts by weight with respect to 100 parts by weight of the binder resin. When the content of the UV curing initiator satisfies the numerical value range, sufficient curing of the binder resin may occur, and strength of a film may be improved.

Further, as circumstances demand, the composition for forming a functional coating layer according to the present disclosure may additionally include one or more additives selected from a leveling agent, a wetting agent, and a defoaming agent. The additives may be added in an amount ranging from 0.01 parts by weight to 10 parts by weight with respect to 100 parts by weight of the binder resin.

Although thickness of the functional coating layer is not limited in the present disclosure, it may be ranged from about 1 μm to about 20 μm and preferably from about 1 μm to about 4 μm. When the thickness of the functional coating layer satisfies the numerical value range, defects such as cracks may be prevented while realizing sufficient functionality.

On the other hand, the functional coating layer may be formed by a method of coating a composition for forming a functional coating layer on a primer layer, and then drying and/or curing the functional coating layer-forming composition coated on the primer layer. The coating process may be performed by coating methods that are well-known in relevant technical fields, e.g., wet type coating processes including a roll coating process, a bar coating process, a spray coating process, a deep coating process and a spin coating process. The coating methods are not limited to the wet type coating processes, but may include other various coating processes used in the relevant technical fields.

On the other hand, the drying process and/or curing process may be performed by a method of irradiating heat and/or light onto the functional coating layer-forming composition coated on the primer layer. The drying process and the curing process may be carried out sequentially or simultaneously. However, it is more preferable that the curing process is conducted through a method of irradiating lights such as UV light for the processing convenience.

Meanwhile, curing conditions may be controlled according to a mixing ratio or components of the functional coating layer-forming composition. For instance, in case of an electron beam curing or UV curing, the functional coating layer-forming composition may be cured by irradiating an electron beam or UV light onto the functional coating layer-forming composition in an amount ranging from about 200 mJ/cm$^2$ to about 1,000 mJ/cm$^2$ for about one second to about ten minutes. In the electron beam curing or UV curing, the binder resin has excellent mechanical properties such as abrasion resistance, and a transparent substrate layer has improved durability since the binder resin may be sufficiently cured when a curing time satisfies the above-described numerical value range.

The polarizing plate of the present disclosure may additionally include a separate layer of the other purpose besides the functional coating layer. For instance, the polarizing plate of the present disclosure may additionally include a contamination preventing layer for preventing contamination of a display surface, and may further include layers of various purposes besides the contamination preventing layer without limitations.

The optical film of the present disclosure may have a primer layer (referred to as 'a first primer layer' for the sake convenience) made of the above-described primer composition according to the present disclosure and formed on one side thereof, and may have a primer layer (referred to as 'a second primer layer' for the sake convenience) made of a previously used urethane-based primer composition and formed on the other side thereof. In this case, a functional coating layer such as a hard coating layer may be adhered to the first primer layer, and an adhesive layer for adhering the second primer layer with a polarizer may be formed on the second primer layer. The adhesive layer may include water based adhesives or non-water based adhesives that are generally used in relevant technical fields to adhere the polarizer to a protection film. Examples of the adhesive layer may include polyvinyl alcohol based adhesives, acrylic adhesives, epoxy based adhesives, urethane based adhesives and the like without limitations. When considering adhesive strength of the protection film with the polarizer, the polyvinyl alcohol based adhesives among the examples are preferable, and modified polyvinyl alcohol based adhesives including acetoacetyl groups and the like among the polyvinyl alcohol based adhesives are more preferable. Although specific examples of the polyvinyl alcohol based adhesives may include Gohsefiner Z-100, Z-200, Z-200H, Z-210, Z-220 and Z-320 manufactured by Nippon Synthetic Chemical Industry Co., Ltd., the polyvinyl alcohol based adhesives are not limited to the examples.

Meanwhile, although the non-water based adhesives are UV-curable adhesives and are not particularly limited, examples of the non-water based adhesives may include: adhesives using a light radical polymerization reaction such as (meth)acrylate based adhesives, en/thiol adhesives, and unsaturated polyester based adhesives; and adhesives using a light cationic polymerization reaction such as epoxy-based adhesives, oxetane-based adhesives, epoxy/oxetane-based adhesives, and vinyl ether-based adhesives.

Here, adhesion of the polarizer and the protection film layer using the non-water based adhesives may be performed by a method of coating an adhesive composition to form an adhesive layer, laminating the polarizer with a protection film, and curing the adhesive composition through light irradiation.

The above-described optical film of the present disclosure may be disposed on at least one side of a polarizer so that the optical film may be usefully used as a polarizer protection film. Namely, the polarizing plate of the present disclosure may include: a polarizer; and the optical film of the present disclosure disposed on at least one side of the polarizer.

More specifically, the polarizing plate of the present disclosure may include a polarizer, a protection film disposed on at least one side of the polarizer, and an adhesive layer interposed between the polarizer and the protection film, wherein the protection film may be an optical film of the present disclosure including a base film and a primer layer formed on at least one side of the base film by a polyester-based primer composition. Detailed descriptions on the polyester-based primer composition and optical film are the same as described above.

As described above, the polarizing plate according to the present disclosure have merits of excellent adhesive strength between a protection film and a functional coating layer as well as excellent optical properties such as transmittancy, polarization degree, and color.

Furthermore, the polarizing plate according to the present disclosure manufactured as described above may be used in various uses. Specifically, the polarizing plate according to the present disclosure may be used in image display devices including a polarizing plate for liquid crystal displays (LCDs) and a polarizing plate for preventing reflection of organic electroluminescence display devices. Furthermore, the polarizing plate according to the present disclosure may be applied to composite polarizing plates in which various functional films, e.g., various optical layers including retardation plates such as a λ/4 plate and a λ/2 plate, light diffusion plates, viewing angle-expanding plates, luminance improving plates, reflection plates and the like are combined.

Further, the above-described optical film and polarizing plate of the present disclosure may be usefully applied to various image display devices such as liquid crystal devices and the like.

MODE FOR INVENTION

Hereinafter, the present disclosure is described in more detail through Examples. However, the following Examples are only for exemplifying the present disclosure, and scopes of the present disclosure are not limited by the following Examples.

PREPARATION EXAMPLE 1

Preparation of a Composition for Forming a Functional Coating Layer 10 g of a urethane acrylate oligomer as a binder resin, 20 g of dipentaerythritol hexaacrylate (DPHA) as a polyfunctional acrylate monomer, 2 g of polyacrylate-co-styrene particles having an average particle diameter of 3.5 µm and a refractive index of 1.59 as organic particles, 2 g of silicon particles having an average particle diameter of 4 µm and a refractive index of 1.43 as inorganic particles, 30 g of ethanol and 30 g of 2-butanol as organic solvents, and 2 g of a UV curing initiator were evenly mixed to prepare a composition for manufacturing an antiglare layer, wherein the binder resin had a refractive index range from about 1.51 to about 1.53.

PREPARATION EXAMPLE 2

(1) Synthesis Example of polyester resin A

After a 500 ml round bottom flask was substituted with nitrogen, ethylene glycol, 2-methyl-1,3 propanediol, sodium sulfonyl isophthalic acid and isophthalic acid were injected into the substituted round bottom flask at a mol ratio of 0.5:0.5:0.5:0.5, and esterification was conducted on ethylene glycol, 2-methyl-1,3 propanediol, sodium sulfonyl isophthalic acid and isophthalic acid in the round bottom flask at 200° C. for two hours so that a theoretical amount of water was removed. After tetramethyl titanate, antimony acetate and dibutyltin oxide as catalysts and trimethyl phosphate were added to the product as a stabilizer so that water was continuously removed, a condensation polymerization reaction was carried out on the mixture at a temperature of 255° C. and a reduced pressure of 2.5 Torr or less for 150 minutes to prepare a polyester resin A.

(2) Synthesis Example of Polyester Acrylic Resin B

After a 500 ml round bottom flask was substituted with nitrogen, ethylene glycol, 2-methyl-1,3 propanediol, sodium sulfonyl isophthalic acid and isophthalic acid were injected into the substituted round bottom flask at a mol ratio of 0.5:0.5:0.5:0.5, and esterification was conducted on ethylene glycol, 2-methyl-1,3 propanediol, sodium sulfonyl isophthalic acid and isophthalic acid in the round bottom flask at 200° C. for two hours so that a theoretical amount of water was removed. After tetramethyl titanate, antimony acetate and dibutyltin oxide as catalysts were injected into the product, and trimethyl phosphate as a stabilizer was added in the product so that water was continuously removed, a condensation polymerization reaction was carried out on the mixture at a reduced pressure of 2.5 Torr or less for 50 minutes. After performing the condensation polymerization reaction, glycidyl(meth)acrylate and methyl(meth)acrylate were injected into the product to a weight ratio of 2:1, the product, glycidyl(meth)acrylate and methyl(meth)acrylate were cooled and stirred to a high speed in water, a reactant and a thermal initiator were injected into the stirred material, and temperature was increased to 80° C. to prepare a polyester acrylic resin B for two hours.

(3) Synthesis Example of Polyester Acrylic Resin C

After a 500 ml round bottom flask was substituted with nitrogen, ethylene glycol, 2-methyl-1,3 propanediol, sodium sulfonyl isophthalic acid and adipic acid were injected into the substituted round bottom flask at a mol ratio of 0.5:0.5:0.5:0.5, and esterification was conducted on ethylene glycol, 2-methyl-1,3 propanediol, sodium sulfonyl isophthalic acid and adipic acid in the round bottom flask at 200° C. for two hours so that a theoretical amount of water was removed. After tetramethyl titanate, antimony acetate and dibutyltin oxide as catalysts were injected into the product, and trimethyl phosphate as a stabilizer was added in the product so that water was continuously removed, a condensation polymerization reaction was carried out on the mixture at a reduced pressure of 2.5 Torr or less for 50 minutes. After performing the condensation polymerization reaction, glycidyl(meth)acrylate and methyl(meth)acrylate were injected into the product to a weight ratio of 2:1, the product, glycidyl(meth)acrylate and methyl(meth)acrylate were cooled and stirred to a high speed in water, a reactant and a thermal initiator were injected into the stirred material, and temperature was increased to 80° C. to prepare a polyester acrylic resin C for two hours.

(4) Synthesis Example of Polyester Acrylic Resin D

After a 500 ml round bottom flask was substituted with nitrogen, ethylene glycol, 2-methyl-1,3 propanediol, sodium sulfonyl isophthalic acid and cyclohexane dicarboxylic acid were injected into the substituted round bottom flask at a mol ratio of 0.5:0.5:0.5:0.5, and esterification was conducted on ethylene glycol, 2-methyl-1,3 propanediol, sodium sulfonyl isophthalic acid and cyclohexane dicarboxylic acid in the round bottom flask at 200° C. for two hours so that a theoretical amount of water was removed. After tetramethyl titanate, antimony acetate and dibutyltin oxide as catalysts were injected into the product, and trimethyl phosphate as a stabilizer was added in the product so that water was continuously removed, a condensation polymerization reaction was carried out on the mixture at a reduced pressure of 2.5 Torr or less for 50 minutes. After performing the condensation polymerization reaction, glycidyl(meth)acrylate and methyl(meth)acrylate were injected into the product to a weight ratio of 2:1, the product, glycidyl(meth)acrylate and methyl(meth)acrylate were cooled and stirred to a high speed in water, a reactant and a thermal initiator were injected into the stirred material, and temperature was increased to 80° C. to prepare a polyester acrylic resin D for two hours.

(5) Synthesis Example of Polyurethane Resin E

After 60 g of methyl ethyl ketone was added in 48 g of a polyester resin A, the polyester resin A and methyl ethyl ketone were sufficiently stirred to dissolve the polyester resin A into methyl ethyl ketone, and 40 g of isophoron diisocyanate was added in the dissolved solution to react the dissolved solution with isophoron diisocyanate at 75° C. for one hour. After finishing the reaction, the product was cooled to 60° C., 12 g of dimethylol propionic acid was added in the cooled product, and the cooled product and dimethylol propionic acid were reacted at 75° C. to obtain a prepolymer solution.

After obtaining the prepolymer solution, the prepolymer solution was cooled to 40° C., 233 g of water was added in the prepolymer solution so that the prepolymer solution and water were stirred to a high speed by a Homo mixer to perform an emulsification process on the stirred material, the emulsified material was neutralized by triethylamine, chains of the neutralized material were extended by isophoron diamine to obtain an emulsion, the emulsion was heated and decompressed to remove methyl ethyl ketone so that an aqueous polyurethane resin E solution was obtained.

(6) Synthesis Example of Polyurethane Resin F

After 60 g of methyl ethyl ketone was added in 48 g of a polycarbonate diol having a molecular weight of 2000 produced by Asahi Kasei Chemicals Corporation, the polycarbonate diol and methyl ethyl ketone were sufficiently stirred to dissolve the polycarbonate diol into methyl ethyl ketone, and 40 g of isophoron diisocyanate was added in the dissolved solution to react the dissolved solution with isophoron diisocyanate at 75° C. for one hour. After finishing the reaction, the product was cooled to 60° C., 12 g of dimethylol propionic acid was added in the cooled product, and the cooled product and dimethylol propionic acid were reacted at 75° C. to obtain a prepolymer solution.

After obtaining the prepolymer solution, the prepolymer solution was cooled to 40° C., 233 g of water was added in the prepolymer solution so that the prepolymer solution and water were stirred to a high speed by a Homo mixer to perform an emulsification process on the stirred material, the emulsified material was neutralized by triethylamine, chains of the neutralized material were extended by isophoron diamine to obtain an emulsion, the emulsion was heated and decompressed to remove methyl ethyl ketone so that an aqueous polyurethane resin F solution was obtained.

EXAMPLE 1

After mixing 40 parts by weight of the prepared polyester resin A with 3 parts by weight of silica and 57 parts by weight of water to prepare a primer composition, the primer composition was coated on one side of a corona-treated acrylic film by a No. 7 bar, and the acrylic film composition was biaxially stretched at 135° C. to manufacture an acrylic film on which a primer layer with a thickness of 600 nm was formed. A corona treatment was performed to a condition of 50 W/m$^2$/min on the surface of the film. After the functional coating layer-forming composition prepared by Preparation Example 1 was coated on the primer layer-coated side of the film by a bar coating process so that a dried thickness of the functional coating layer-forming composition would be 4 μm, UV light of 280 mJ/cm$^2$ were irradiated onto the functional coating layer-forming composition so that the functional coating layer-forming composition was cured to obtain a film having a functional coating layer formed thereon.

EXAMPLE 2

After respectively mixing 40 parts by weight of the prepared polyester resin A and 40 parts by weight of the prepared polyurethane resin E with 3 parts by weight of silica and 57 parts by weight of water to prepare primer compositions A and E, the primer composition A was coated on one side of a corona-treated acrylic film by a No. 7 bar, the primer composition A coated on the corona-treated acrylic film was dried at 100° C. for three minutes, the primer composition E was coated on the other side of the corona-treated acrylic film by the No. 7 bar, and the acrylic film was biaxially stretched to manufacture an acrylic film having a primer layer with a thickness of 600 nm formed on both sides thereof. A corona treatment was performed to a condition of 50 W/m$^2$/min on the surface of the film.

After the functional coating layer-forming composition prepared by Preparation Example 1 was coated on the primer composition A-coated side of the film by a bar coating process so that a dried thickness of the functional coating layer-forming composition would be 4 μm, UV light of 280 mJ/cm$^2$ were irradiated onto the functional coating layer-forming composition so that the functional coating layer-forming composition was cured to obtain a film having a functional coating layer formed thereon.

After obtaining the film having the functional coating layer formed thereon, a polyvinyl alcohol based adhesive was coated on both sides of a polarizer, a functional coating layer-formed acrylic film and an alkali-treated TAC film were disposed on both sides of the polarizer, the functional coating layer-formed acrylic film and the alkali-treated TAC film were pressed onto the polarizer using a pressing roll, and the functional coating layer-formed acrylic film and the alkali-treated TAC film pressed onto the polarizer were dried to a temperature of 80° C. for five minutes using hot air to manufacture a polarizing plate. The acrylic film was constructed in such a way that an opposite side of the side of the acrylic film having the functional coating layer formed thereon, i.e., the side of the acrylic film having the primer composition E coated thereon was disposed toward the polarizer.

EXAMPLE 3

After respectively mixing 40 parts by weight of the prepared polyester resin A and 40 parts by weight of the prepared polyester acrylic resin B with 3 parts by weight of silica and 57 parts by weight of water to prepare primer compositions A and B, the primer composition A was coated on one side of a corona-treated acrylic film by a No. 7 bar, the primer composition A coated on the corona-treated acrylic film was dried at 100° C. for three minutes, the primer composition B was coated on the other side of the corona-treated acrylic film by the No. 7 bar, and the acrylic film was biaxially stretched to manufacture an acrylic film having a primer layer with a thickness of 600 nm formed on both sides thereof. A corona treatment was performed to a condition of 50 W/m²/min on the surface of the film.

After the functional coating layer-forming composition prepared by Preparation Example 1 was coated on the primer composition A-coated side of the film by a bar coating process so that a dried thickness of the functional coating layer-forming composition would be 4 μm, UV light of 280 mJ/cm² were irradiated onto the functional coating layer-forming composition so that the functional coating layer-forming composition was cured to obtain a film having a functional coating layer formed thereon.

After obtaining the film having the functional coating layer formed thereon, a UV adhesive was coated on both sides of a PVA polarizer by a dropping pipette, an acrylic film was laid up on both sides of the PVA polarizer, conditions for obtaining a final adhesive layer thickness of 1 to 2 μm were set, and then the acrylic film laid up on both sides of the PVA polarizer passed through a laminator at a speed of 5 m/min. After passing the acrylic film laid up on the PVA polarizer through the laminator, a UV irradiating device (metal halide lamp) irradiated UV light of 500 mJ/cm² on the acrylic film pressed onto the PVA polarizer to manufacture a polarizing plate. The acrylic film was constructed in such a way that an opposite side of the side of the acrylic film having the functional coating layer formed thereon, i.e., the side of the acrylic film having the primer composition B coated thereon was disposed toward the polarizer.

EXAMPLE 4

A functional coating layer-formed film was obtained by the same method as Example 1 except that the polyester acrylic resin B instead of the polyester resin A was used.

EXAMPLE 5

A functional coating layer-formed film was obtained by the same method as Example 1 except that the polyester acrylic resin C instead of the polyester resin A was used.

EXAMPLE 6

A functional coating layer-formed film was obtained by the same method as Example 1 except that the polyester acrylic resin D instead of the polyester resin A was used.

EXAMPLE 7

A polarizing plate was manufactured by the same method as Example 3 except that the polyester acrylic resin B was used in the primer layer for the functional coating layer and the polyester acrylic resin C was used in the primer layer for the UV adhesive.

COMPARATIVE EXAMPLE 1

A functional coating layer-formed film was obtained by the same method as Example 1 except that the polyurethane resin E instead of the polyester resin A was used.

COMPARATIVE EXAMPLE 2

A functional coating layer-formed film was obtained by the same method as Example 1 except that the polyurethane resin F instead of the polyester resin A was used.

Test Example

Adhesive forces of functional coating layers, solvent resistances and adhesive forces with adhesive layers of films or polarizing plates manufactured by the Examples 1 to 7 and Comparative Examples 1 to 2 were measured by methods as described below. Measurement results are listed as represented by the following Table 1.

<Method of Measuring Adhesive Forces of Functional Coating Layers>

After respectively making horizontal and vertical cuts to a distance of 1 mm in functional coating layers having an area of 10×10 and attaching tapes onto the cuts, the tapes were taken off to evaluate adhesion values by the extents in which the functional coating layers were removed. When removed areas of the functional coating layers were from 0% to 20%, the adhesion values were evaluated as OK, and when the removed areas of the functional coating layers were more than 20%, the adhesion values were evaluated as NG.

<Method of Measuring Solvent Resistances>

A drop of an alcohol such as IPA, EtOH or 2-BuOH was dropped on primer layers before the formation of functional coating layers in the above-described Examples 1 to 7 and Comparative Examples 1 and 2, the primer layers were rubbed down with tissue ten times in 20 seconds after dropping the alcohol, and then solvent resistances were evaluated as OK when the primer layers were not rubbed off, and the solvent resistances were evaluated as NG when the primer layers were rubbed off while becoming hazy.

<Method of Measuring Adhesive Forces with Adhesive Layers>

90 degree adhesive peel strength tests were conducted on polarizing plates manufactured by Examples 2 and 3 using a Stable Micro Systems' TA.XT Plus texture analyzer. Specimens having a width of 2 cm and a length of 8 cm were manufactured, faces of acrylic films were fixed to the bottom side of the measuring instrument, and 90 degree adhesive peel strengths of the specimens were measured in a measuring distance of 5 cm. As results of measuring the adhesive peel strengths of the specimens, adhesive forces with adhesive layers were evaluated as OK when the peel strengths were 2 N or more, and the adhesive forces with adhesive layers were evaluated as NG when the peel strengths were less than 2 N.

TABLE 1

| Classification | Solvent resistance | Adhesive force | Adhesive forces with adhesive layers |
|---|---|---|---|
| Example 1 | OK | OK | — |
| Example 2 | OK | OK | OK |
| Example 3 | OK | OK | OK |
| Example 4 | OK | OK | — |
| Example 5 | OK | OK | — |
| Example 6 | OK | OK | — |
| Example 7 | OK | OK | OK |
| Comparative Example 1 | NG | NG | — |
| Comparative Example 2 | NG | NG | — |

As listed in the Table 1, it can be seen that polyester-based primer compositions of the present disclosure display excellent adhesive forces with the functional coating layers compared to Comparative Examples 1 and 2 using polyurethane primer compositions.

The invention claimed is:
1. A polyester-based primer composition comprising:
    100 parts by weight of a polyester resin comprising repeating units represented by the following Formula 1;
    1 to 20 parts by weight of water-dispersible particles; and
    water as a remainder,

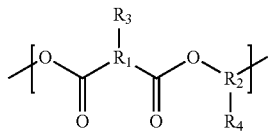

[Formula 1]

where $R_1$ and $R_2$ independently refer to hydrogen, a substituted or unsubstituted $C_{1-20}$ alkyl, a substituted or unsubstituted $C_{1-20}$ aryl, or a substituted or unsubstituted $C_{3-20}$ cycloalkyl; $R_3$ and $R_4$ independently refer to hydrogen, a substituted or unsubstituted $C_{1-20}$ alkyl, a substituted or unsubstituted $C_{1-20}$ aryl, a substituted or unsubstituted $C_{3-20}$ cycloalkyl, a carboxyl group, a hydroxyl group, or a sulfonate group; and at least one of $R_3$ and $R_4$ refers to a carboxyl group, a hydroxyl group, or a sulfonate group.

2. The polyester-based primer composition of claim 1, wherein the polyester resin comprises a polyester glycol formed through a reaction of a polybasic acid and a polyol.

3. The polyester-based primer composition of claim 2, wherein the polybasic acid comprises one selected from the group consisting of aromatic carboxylic acids, aliphatic carboxylic acids, alicyclic carboxylic acids, acid anhydrides thereof, alkyl esters thereof, and acid halides thereof.

4. The polyester-based primer composition of claim 2, wherein the polyol comprises at least one selected from the group consisting of ethylene glycol, 1,2-propanediol, 1,3-propanediol, 1,3-butanediol, 1,4-butanediol, neopentyl glycol, pentanediol, 1,6-hexanediol, 1,8-octanediol, 1,10-decanediol, 4,4'-dihydroxyphenylpropane, 4,4'-dihydroxymethylmethane, diethylene glycol, triethylene glycol, polyethylene glycol (PEG), dipropylene glycol, polytetramethylene glycol (PTMG), polypropylene glycol (PPG), 1,4-cyclohexanedimethanol, 1,4-cyclohexanediol, bisphenol A, bisphenol F, glycerin, 1,1,1-trimethylolpropane, 1,2,5-hexatriol, pentaerythritol, glucose, sucrose, and sorbitol.

5. The polyester-based primer composition of claim 2, wherein the polyester resin further comprises an acrylic monomer.

6. The polyester-based primer composition of claim 5, wherein the acrylic monomer is at least one selected from the group consisting of alkyl(meth)acrylates, alkyl acrylates, alkyl(meth)acrylic acids, alkyl acrylic acids, epoxy acrylates, and hydroxyalkyl acrylates.

7. The polyester-based primer composition of claim 5, wherein the polyester resin comprises the polyester glycol and the acrylic monomer in a weight ratio range from 1:9 to 9:1.

8. The polyester-based primer composition of claim 1, wherein the water-dispersible particles have an average diameter from 10 nm to 200 nm.

9. The polyester-based primer composition of claim 1, wherein the water-dispersible particles comprise: inorganic particles which is at least one selected from the group consisting of silica, titania, alumina, zirconia, and antimony-based particles; organic particles which is at least one selected from the group consisting of silicone-based resins, fluorine-based resins, (meth)acrylic resins, cross-linked polyvinyl alcohols, and melamine-based resins; or a combination thereof.

10. An optical film comprising:
    a base film; and
    a primer layer formed on at least one side of the base film by using the polyester-based primer composition of claim 1.

11. The optical film of claim 10, wherein a functional coating layer is formed on the primer layer.

12. The optical film of claim 10, wherein the base film is an acrylic film.

13. The optical film of claim 12, wherein the acrylic film comprises a copolymer comprising an alkyl(meth)acrylate based unit and a 3- to 6-membered heterocyclic unit substituted by at least one carbonyl group.

14. The optical film of claim 12, wherein the acrylic film further comprises an aromatic resin having a carbonate part on a main chain thereof.

15. A polarizing plate comprising:
    a polarizer; and the optical film of claim 10 disposed on at least one side of the polarizer.

* * * * *